United States Patent
Horiike et al.

(10) Patent No.: US 6,475,446 B1
(45) Date of Patent: *Nov. 5, 2002

(54) CARRIER BODY FOR EXHAUST GAS CATALYSTS

(75) Inventors: Tetsuro Horiike, Kanagawa; Kimiyoshi Nishizawa; Hideaki Takahashi, both of Yokohama, all of (JP)

(73) Assignee: Nissan Motor Co., Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,470

(22) PCT Filed: May 28, 1997

(86) PCT No.: PCT/JP97/01802

§ 371 (c)(1),
(2), (4) Date: Dec. 16, 1997

(87) PCT Pub. No.: WO97/45200

PCT Pub. Date: Dec. 4, 1997

(30) Foreign Application Priority Data

May 31, 1996 (JP) .............................. 8-138942
Jun. 6, 1996 (JP) .............................. 8-144674

(51) Int. Cl.[7] .......................... B01D 53/34; B01J 32/00; B01J 35/04
(52) U.S. Cl. .................. 422/180; 422/177; 502/439; 502/527.19; 428/116; 428/593
(58) Field of Search .................................. 422/171, 177, 422/174, 180, 199, 211, 222; 502/439, 527.22, 527.19; 29/890; 428/116, 593

(56) References Cited

U.S. PATENT DOCUMENTS

| | | | |
|---|---|---|---|
| 4,818,746 A | 4/1989 | Cyron | 502/439 |
| 4,845,073 A | 7/1989 | Cyron | 502/439 |
| 5,374,402 A | * 12/1994 | Hitachi et al. | 422/180 |
| 5,480,621 A | 1/1996 | Breuer et al. | 422/174 |
| 5,549,873 A | 8/1996 | Pott | 422/180 |
| 5,567,395 A | 10/1996 | Okabe et al. | 422/180 |
| 5,593,645 A | 1/1997 | Steenackers et al. | 422/176 |
| 5,599,509 A | 2/1997 | Toyao et al. | 422/180 |
| 5,658,536 A | * 8/1997 | Okabe et al. | 422/180 |

FOREIGN PATENT DOCUMENTS

| | | |
|---|---|---|
| JP | 62-83044 | 4/1987 |
| JP | 4-81635 | 7/1992 |
| JP | 4-504226 | 7/1992 |
| JP | 6-269683 | 9/1994 |
| JP | 8-117608 | 5/1996 |

* cited by examiner

*Primary Examiner*—Hien Tran
(74) *Attorney, Agent, or Firm*—Foley & Lardner

(57) ABSTRACT

A metal catalyst carrier body includes layers of first and second metal sheets defining passages through which exhaust gases flow. The first metal sheet is corrugated and engaged with the second metal sheet in each of upstream and downstream regions at numeral contact points. In intermediate region between the upstream and downstream regions, the first metal sheet is out of engagement with the second metal sheet.

14 Claims, 8 Drawing Sheets

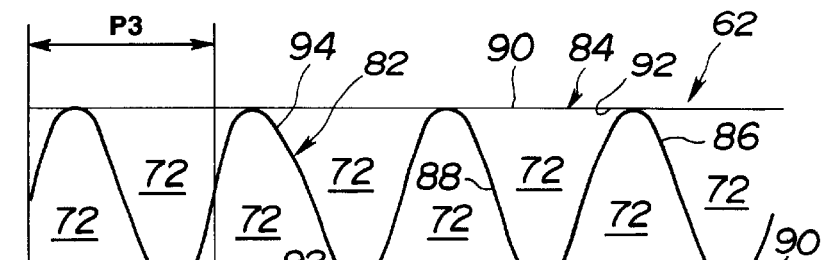
FIG. 7
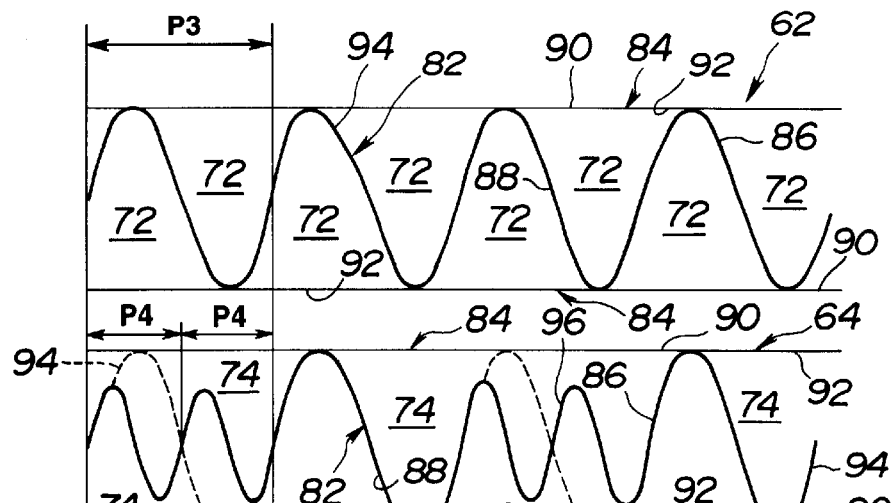
FIG. 8
FIG. 9
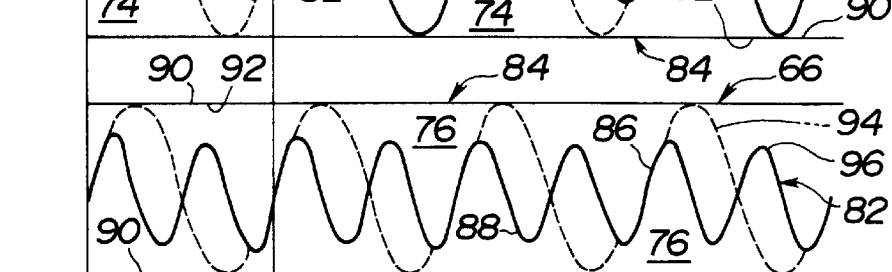
FIG. 10
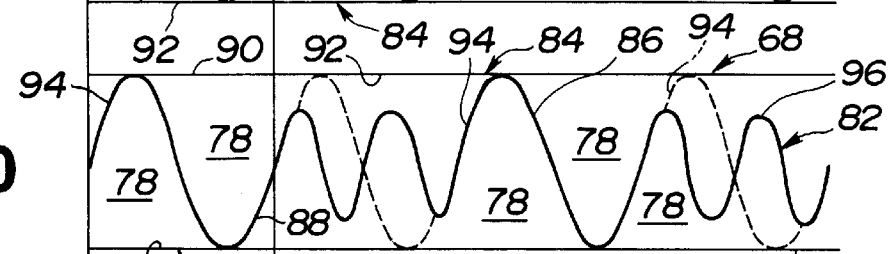
FIG. 11
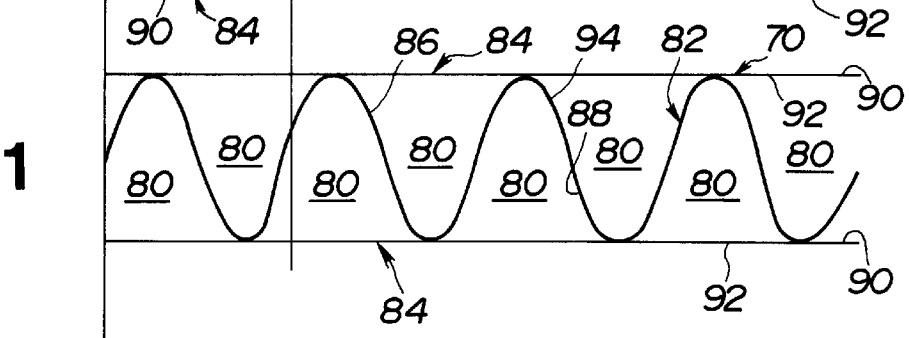

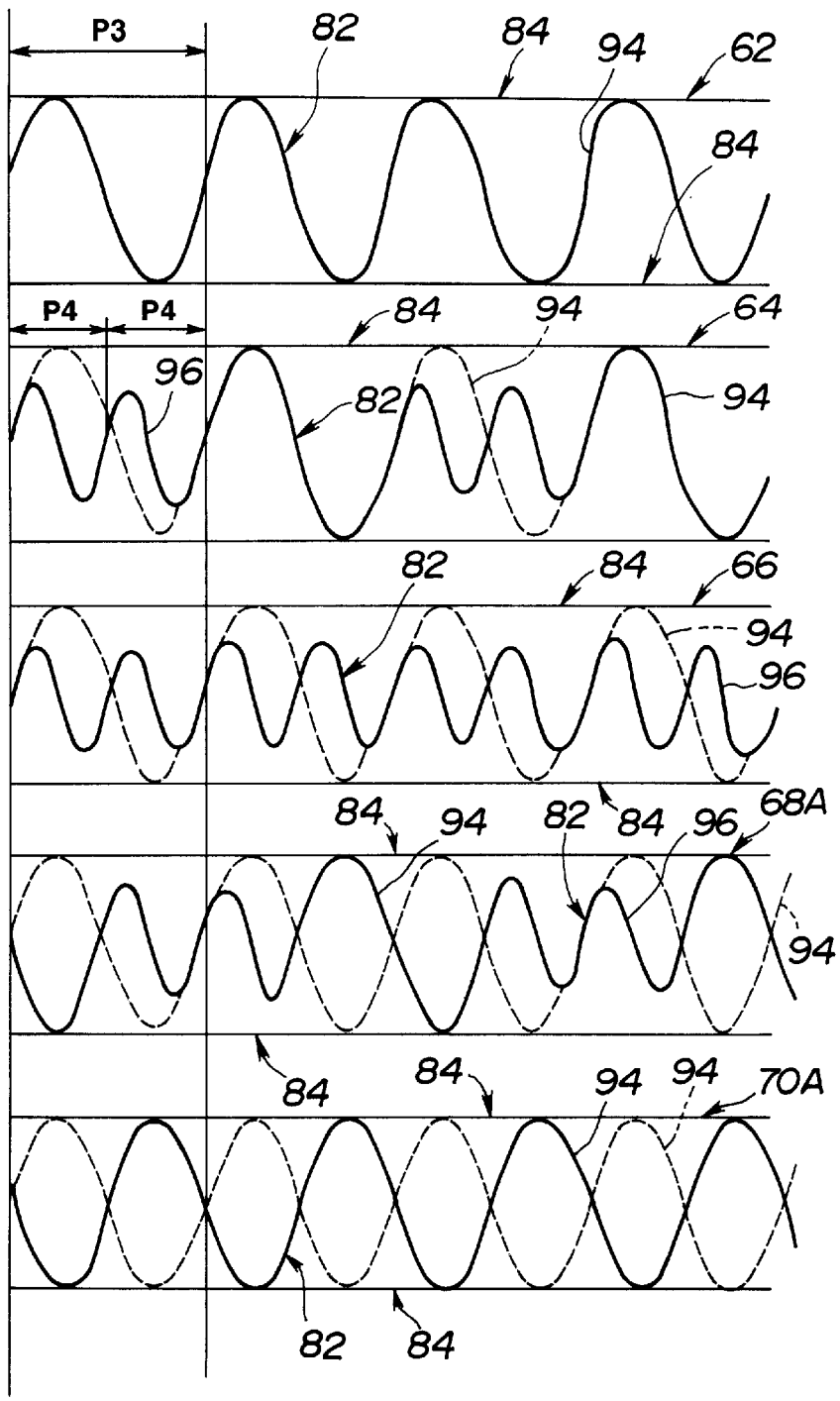

CARRIER BODY FOR EXHAUST GAS CATALYSTS

BACKGROUND OF THE INVENTION

1. Field of the Invention

The present invention relates to a carrier body for exhaust gas catalysts, and more particularly to a metal carrier body including wound, stacked or otherwise layered layers of high-temperature corrosion-proof metal sheets, which form a plurality of channels or passages through which exhaust gas flow.

2. Description of the Related Art

Metal carrier bodies of this type are used, for example, in the exhaust gas systems of motor vehicles. These carrier bodies are exposed to severe alternating thermal stresses, which limit the service life thereof.

Various ways of increasing the elasticity of such carrier bodies and of controlling the compressive and tensile forces have been proposed. Japanese Published Non-Prosecuted Application JP-A 62-83044, corresponding to German Published Non-Prosecuted Application DE-A 35 34 904 discloses a catalyst carrier body which is made up of alternating layers of two dissimilar metal sheets consisting of a first metal sheet with double corrugations and a second metal sheet without any corrugation. In the carrier body of this type, the number of contact points between the two metal sheet is decreased, thereby providing the required elasticity. Japanese Published Non-Prosecuted Application JP-A 6-269683 discloses a catalyst carrier body in which two dissimilar metal sheets forming alternating layers are a first metal sheet with a simple corrugation and a second metal sheet without any corrugation, respectively. According to this known carrier body, at least one of the first and second metal sheets is formed with cutouts or openings. Alternatively, at least one of the first and second metal sheets is divided into a plurality of segments arranged in spaced relationships. In this carrier body, the cutouts or openings or spaces between the segments can control the compressive and tensile forces.

Carrier bodies are known which are wound from alternating layers of two differently corrugated metal sheets. One example is described in U.S. Pat. No. 4,845,073 issued on Jul. 4, 1989 to Cyron. In this known carrier body, the metal sheets have inner and outer surfaces, and the contact points are disposed on the inner surface of the first metal sheet and on the outer surface of the second metal sheet. During winding, the inwardly oriented troughs are synchronized with inwardly oriented troughs of the second metal sheet.

SUMMARY OF THE INVENTION

An object of the present invention is to provide a carrier body for exhaust gas catalyst, which, with sufficiently high structural rigidity, has reduced mass to be heated as well as increased effective surface area exposed to exhaust gas.

According to one aspect of the present invention, there is provided a carrier body for exhaust gas catalysts, comprising:

layers of first and second metal sheets defining passages through which gas flows;

said layers having an upstream region and a downstream region, with respect to direction in which gas flows, which are spaced from each other;

said layers having an intermediate region disposed between said upstream and downstream regions;

said first metal sheet being so corrugated as to be brought into contact with said second metal sheet in each of said upstream and downstream regions.

Wherein, in each of said upstream and dowstream regions, said first metal sheet has a first corrugation with first amplitude; and wherein, in said intermediate region, said first metal sheet has a second corrugation with a second amplitude that is less than the first amplitude.

BRIEF DESCRIPTION OF DRAWINGS

FIG. 7 is a section taken through the line 7—7 of FIG. 6;

FIG. 8 is a section taken through the line 8—8 of FIG. 6;

FIG. 9 is a section taken through the line 9—9 of FIG. 6;

FIG. 10 is a section taken through the line 10—10 of FIG. 6;

FIG. 11 is a section taken through the line 11—11 of FIG. 6;

FIG. 15 is a section taken through the line 15—15 of FIG. 14;

FIG. 16 is a section taken through the line 16—16 of FIG. 14;

FIG. 17 is a section taken through the line 17—17 of FIG. 14;

FIG. 18 is a section taken through the line 18—18 of FIG. 14; and

FIG. 19 is a section taken through the line 19—19

DETAILED DESCRIPTION OF THE PREFERRED EMBODIMENTS

Figure 1:
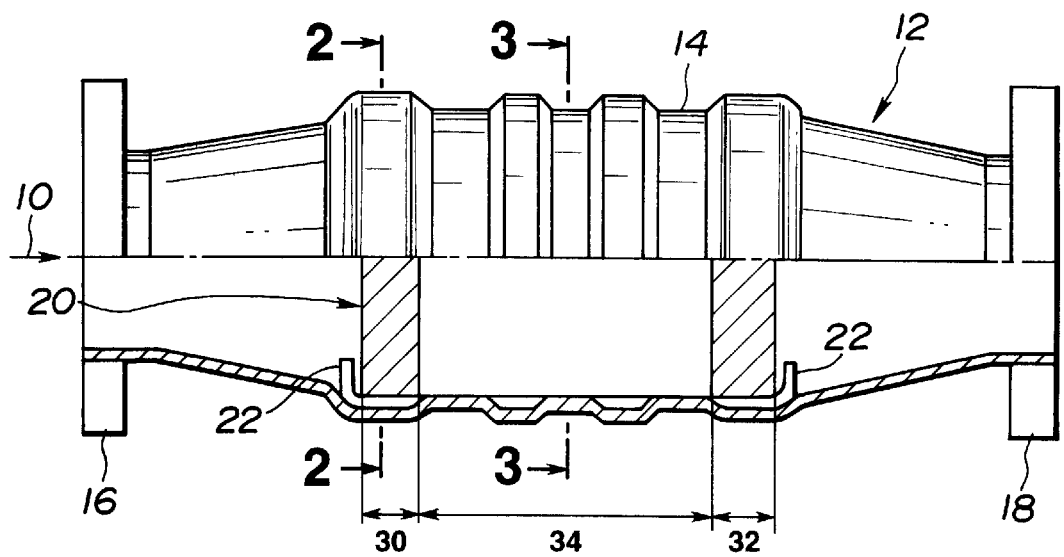
FIG. 1 is a longitudinal view of a catalytic converter partially broken away to show a longitudinal section thereof.

Referring to the drawings and particularly to FIG. 1, exhaust gas from an internal combustion engine is supplied in the direction of an arrow 10 to an exhaust gas converter 12. The exhaust gas converter 12 has a shell-like housing 14. The housing 14 has at one longitudinal end thereof an inlet 16 and at the opposite longitudinal end thereof an outlet 18. A carrier body 20 for exhaust gas catalysts has a support 22, and it is mounted in the housing 14. The carrier body 20 may be divided into and consists of three regions, namely, an upstream region 30, a downstream region 32, and an intermediate region 34 between the upstream and downstream regions 30 and 32, respectively.

Figure 2:
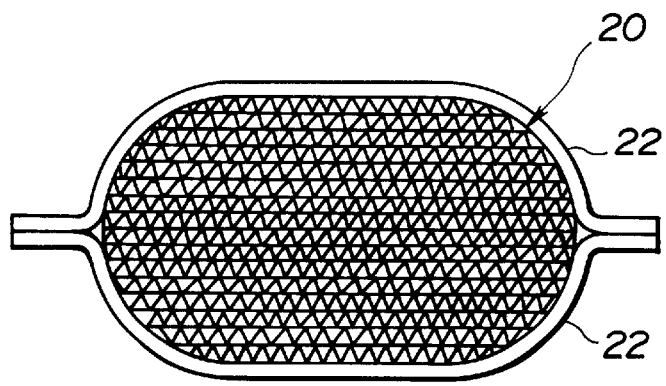
FIG. 2 is a section taken through the line 2—2 in FIG. 1, showing a portion of a first embodiment of a carrier body according to the present invention.
Figure 4:
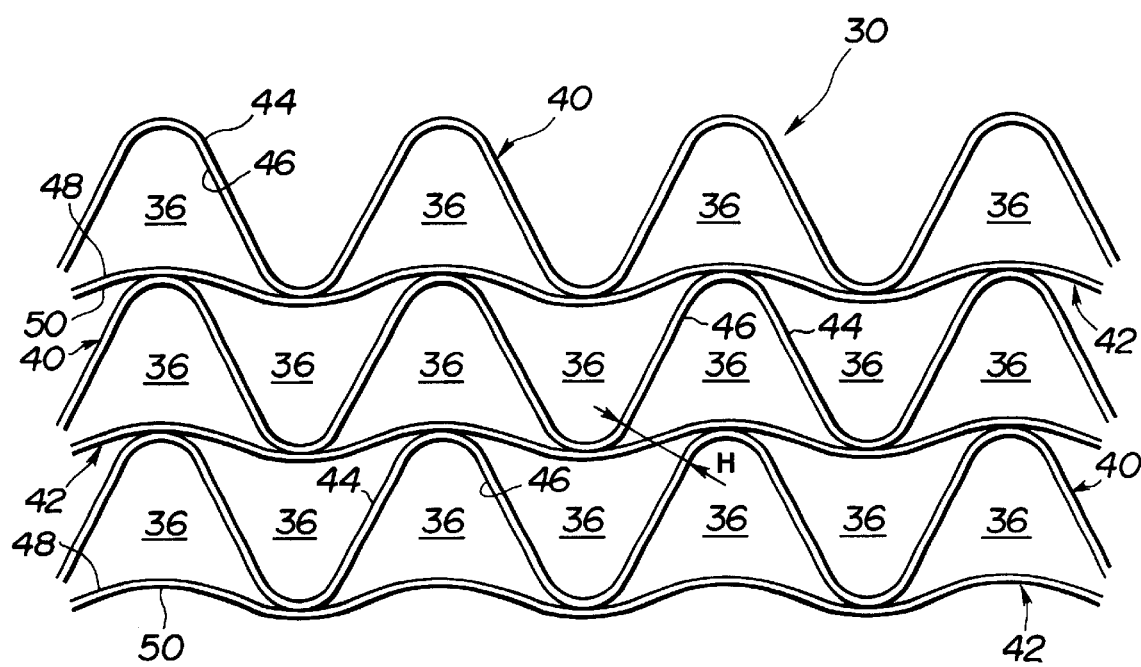
FIG. 4 is an enlarged fragmentary view of FIG. 2.

FIG. 2 shows exhaust passages in the upstream regions 30, and FIG. 4 is an enlarged fragmentary view of the exhaust passages 36. The downstream region 32 is identical in construction to the upstream region 30.

Figure 3:
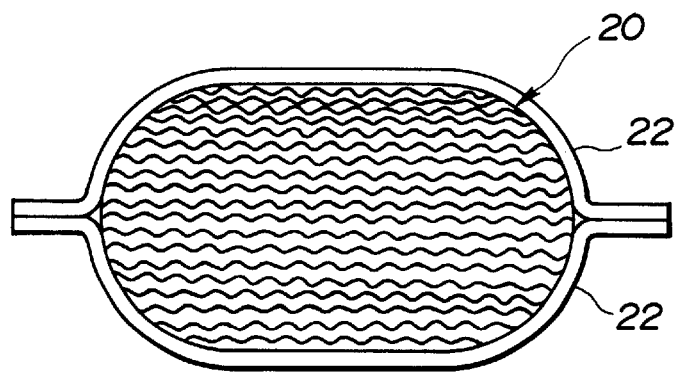
FIG. 3 is a section taken through the line 3—3 in FIG. 1 showing another portion of the first embodiment according to the present invention.
Figure 5:
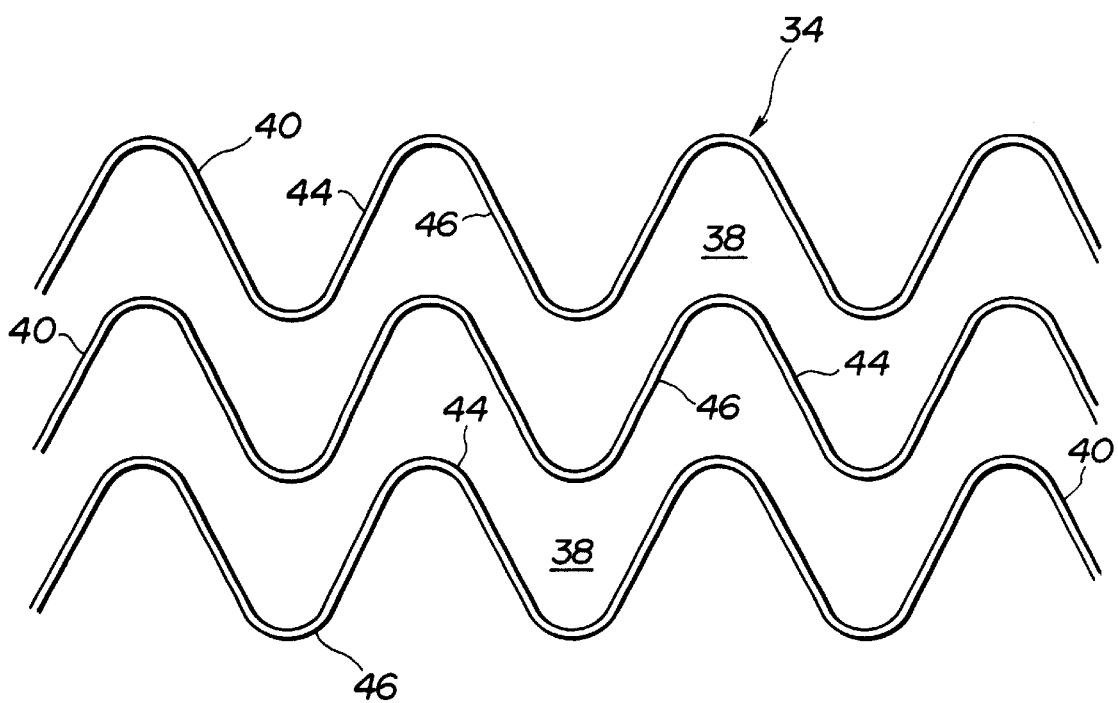
FIG. 5 is an enlarged fragmentary view of FIG. 3.

FIG. 3 shows exhaust passages in the intermediate region 34 and FIG. 5 is ran enlarged fragmentary view of the exhaust passage 38. In each of the upstream and downstream regions, the carrier body 20 includes stacked alternating layers of two different corrugated metal sheets, namely, a first metal sheet 40 and a second metal sheet 42. In the intermediate region 34, the carrier body 20 includes spaced layers of one of the two different corrugated metal sheets 40 and 42.

The two corrugated metal sheets 40 and 42 have periodicity permitting them to be synchronized with one another when they are stacked. The result is a very uniform distribution of contact points, which have shapes that adapt to one another and an identical direction of curvature between the two metal sheets 40 and 42.

Viewing in FIG. 4, the first metal sheet 40 has upper and lower surfaces 44 and 46, and the second metal sheet 42 has upper and lower surfaces 48 and 50. The contact points may be divided into a first group and a second group. The contact points of the first group are disposed on the lower surface 46 of the first sheet metal 40 and on the upper surface 48 of the second sheet metal 42. In other words, the downwardly oriented troughs of the corrugation of the first metal sheet 40 are synchronized with the downwardly oriented troughs of the corrugation of the second metal sheet 42 during stacking the metal sheets 40 and 42 one after another. The contact points of the second group are disposed on the upper surface 44 of the first metal sheet 40 and on the lower surface 50 of the second metal sheet 42. In other words, the upwardly oriented crests of the corrugation of the first. metal sheet 40 are synchronized with the upwardly oriented crests of the corrugation of the second metal sheet 42 during stacking the metal sheets 40 and 42 one after another.

In this example, the first metal sheet 40 extend through the whole lengths, in the longitudinal direction of the carrier body 20, of the upstream region 30, intermediate region 34 and downstream region 32. The second metal sheet 42 extends through the whole length of the upstream region 30 and that of the downstream region 32 only. In other words, the second metal sheet 42 does not extend through the intermediate region 34 as seen from FIGS. 3 and 5.

The corrugation of the first metal sheet 40 has a periodicity P1 and amplitude A1, while the corrugation of the second metal sheet 42 has a periodicity P2 and amplitude A2. P2 is substantially the same as P1 and A2 is sufficiently smaller than A1 to cause the curvature of the first metal sheet 40 at the contact points to be somewhat greater than the curvature of the second metal sheet 42 at the contact points.

Preferably, P1=P2, A1=nP1 and A1=mA2, where: n ranges from 0.2 to 0.3, and m ranges from 2.4 to 6.

In this example, the corrugations are substantially sinusoidal. The waveform is a sinewave form. The first metal sheet 40 has the wave height 2A1 (twice the wave amplitude A1) of 1.2 mm and the wavelength P1 ranging from 2.0 mm to 3.0 mm. The second metal sheet 42 has the wave height 2A2 (twice the wave amplitude A2) ranging from 0.2 mm to 0.5 mm and the wavelength P2 substantially equal to P1.

Due to the fact that P1 is substantially equal to P2, the crests and troughs of the stacked layers of the first metal sheet 40 are aligned in the longitudinal direction through the whole length of the intermediate region 34. In the intermediate region 34, the cross sections of the passages 38 that are particularly narrow or wide are not produced. This is advantageous upon subsequent coating of the carrier body 20 with the catalyst material. This is because small gaps that become plugged are not produced.

Thus, in the intermediate region 34, the first metal sheet 40 has sufficiently wide effective surface area, i.e., the surface area of catalyst coating layer, that can contact with exhaust gases. This can minimize waste in catalyst coating.

Besides, it is assured that the exhaust gases contact sufficiently with the catalyst coating, resulting in increased conversion efficiency of the catalyst.

During a cold start, the temperature of the catalyst of the exhaust gas converter 12 is below its start-up temperature and must be brought to its operating temperature by the exhaust gases of the engine. The smaller the mass of catalyst to be heated, the quicker it will reach its start-up temperature. In the intermediate region 34 of the carrier body 20, the second metal sheet 42 is not employed, causing a reduction in the mass to be heated. The result is a reduction in time required for the catalyst to reach its start-up, temperature.

In the intermediate region 34 of the carrier body 20, the stacked layers of the first metal sheet 40 can be condensed without producing any local narrow gaps that might become plugged because the crests and troughs are held aligned in the longitudinal direction of the carrier body 20. This is advantageous in increasing the effective surface area of the catalyst coating that becomes exposed to the exhaust gases.

Referring to FIG. 4, the distance H between the adjacent layers of the first metal sheet 40 can be narrowed by using layers of the second metal sheet 42 with increased amplitude A2.

In the previously described embodiment, the second metal sheet 42 has been removed in the intermediate region 34. Alternatively, the first metal sheet 40 may be removed in the intermediate region 34 of the carrier body 20.

According to the first embodiment, the carrier body 20 is made up of stacked layers of two dissimilar or differently corrugated metal sheets 40 and 42. However, the present invention may be embodied in a carrier body including wound layers of the dissimilar corrugated metal sheets 40 and 42.

In the first embodiment of the carrier body 20, there exists no contact point between the first and second metal sheets 40 and 42 in the intermediate region 34 due to the removal of the second metal sheet 42.

In the second embodiment to be described below, a double corrugated metal sheet is used as the first metal sheet. The double corrugated metal sheet includes, in addition to a first corrugation, a second corrugation with an amplitude smaller than the amplitude of the first corrugation. In each of upstream and downstream regions of a carrier body, the first corrugation makes contact with layers of the second metal sheet. In the intermediate region, the second corrugation is disposed in spaced relation with the second metal sheets. In other words, there exists no contact point in the intermediate region.

Referring to FIGS. 6 to 13, the second embodiment of a carrier body 60 is described.

Figure 6:
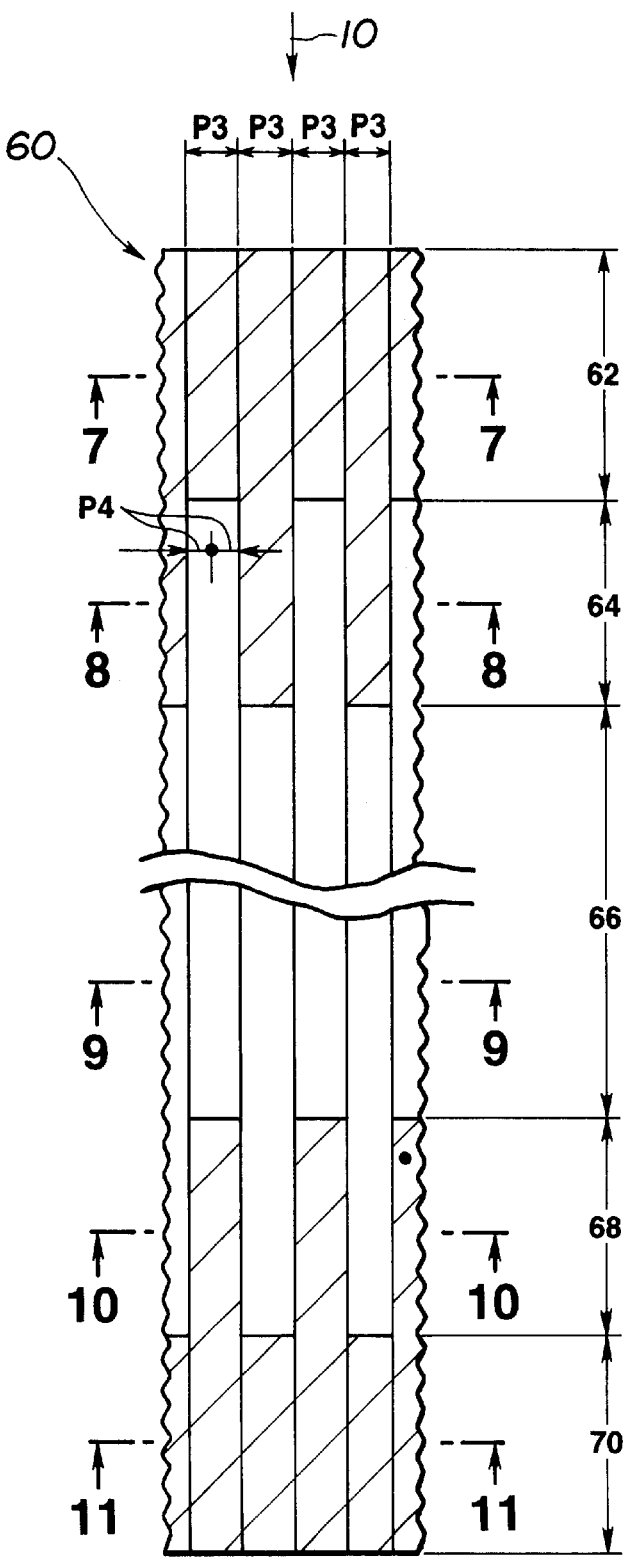
FIG. 6 is a fragmentary diagram of a second embodiment of a carrier body according to the present invention.

FIG. 6 shows, in diagram, a partial plan view of the carrier body 60 in which an arrow 10 indicates the direction of exhaust gases from an internal combustion engine supplied to the carrier body 60. The carrier body 60 may be divided into and consists of five regions, namely an upstream region 62, a first transition region 64, an intermediate region 66, a second transition region 68 and a downstream region 70. FIG. 7 shows exhaust passages in the upstream region 62. FIG. 8 shows exhaust passages 74 in the first transition region 64. FIG. 9 shows exhaust passages 76 in the intermediate region 66. FIG. 10 shows the exhaust passages 78 in the second transition region 68. FIG. 11 shows exhaust passages 80 in the downstream region 70.

In each of these regions 62, 64, 66, 68 and 70, the carrier body 60 includes stacked alternating, layers of a first metal sheet 82 and a second metal sheet 84. In this example, the first metal sheet 82 has double corrugations, and the second metal sheet 84 is a smooth flat sheet. Alternatively, the second metal sheet 84 may have a sinusoidal waveform. As different from the first embodiment, the second metal sheet 84 extends through the entire length of the first transition region 64, intermediate region 66 and second transition region 68.

Viewing in FIGS. 7 through 11, the first metal sheet 82 has upper and lower surfaces 86 and 88, and the second metal sheet 84 has upper and lower surfaces 90 and 92. The first and second metal sheets 82 and 84 are stacked one after another. The result is a uniform distribution of a great number of contact points in each of the upstream and downstream regions 62 and 70 (see FIGS. 7 and 11). There occurs a uniform distribution of reduced number of contact points in each of the first and second transition regions 64 and 68 (see FIGS. 8 and 10). In the intermediate region 66 (see FIG. 9), there is no contact point. The contact points may be divided into a first group and a second group. The contact points of the first group are disposed on the lower surface 88 of the first metal sheet 82 and on the upper surface 90 of the second metal sheet 84. In other words, the downwardly oriented troughs of a first one 94 of the double corrugations of the first metal sheet 82 are brought into contact with the upper surface 90 of the second metal sheet 84 during stacking the metal sheets 82 and 84 one after another. The contact points of the second group are disposed on the upper surface 86 of the first metal sheet 82 and on the lower surface 92 of the second metal sheet 84. In other words, the upwardly oriented crests of the first corrugation 94 of the first metal sheet 82 are brought into contact with the lower surface 92 of the second metal sheet 84 during stacking the metal sheets 82 and 84.

The first metal sheet 82 has, in addition to the first corrugation 94, a second corrugation 96. The first corrugation 94 has a periodicity P3 and amplitude A3. The second corrugation 96 has a periodicity P4 and amplitude A4. A4 is smaller than A3 and P4 is expressed by the formula:

$$P4=P3\times(1/N)$$

where: N≧2 (N is the integer).

In this example, N is 2 and thus P4=P3×(½) holds. Since, in this example, the corrugations 94 and 96 are substantially sinusoidal and the waveform is a sine-wave form, two small waves of the second corrugation 96 has replaced one big wave of the first corrugation 94.

Turning back to FIG. 6, the first corrugation 94 extends through each of portions as indicated by the shadowed area, while the second corrugation 96 extends through each of void portions. In FIGS. 8, 9 and 10, the, dashed line illustrates the first corrugation 94, which extends through the upstream portion 62.

Figure 12:
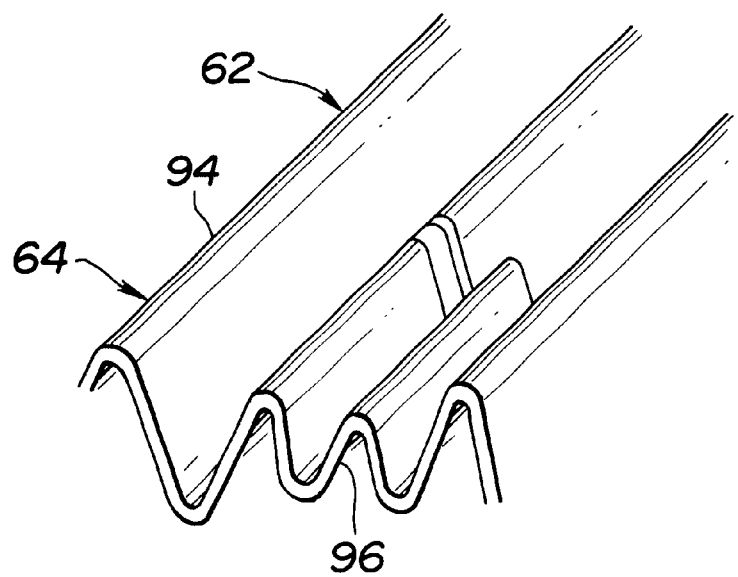
FIG. 12 is a fragmentary perspective view of one portion of the carrier body.

In the first transition region 64 shown in FIG. 8, two small waves of the second corrugation 96 have replaced every other one of the big waves of the first corrugation 94. In the intermediate region 66 shown in FIG. 9, two small waves of the second corrugation 96 have replaced the other big waves of the first corrugation 94. In the second transition, region 68 shown in FIG. 10, every other one of the big waves of the first corrugation 94 which has been replaced by the two small waves of the second corrugation 96 in the first transition region 64 reinstates as shown in FIG. 12. In the downstream region 70 shown in FIG. 11, all of the big waves of the first corrugation 94 reinstate.

Figure 13:
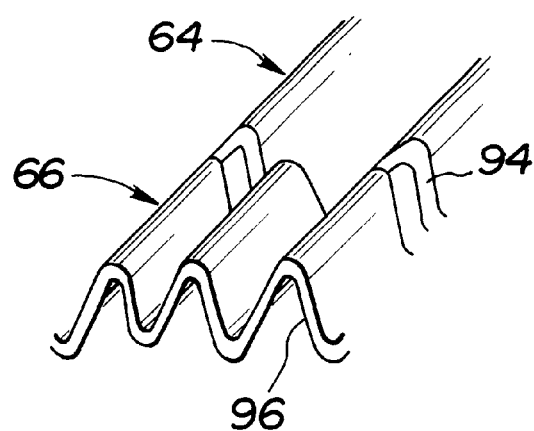
FIG. 13 is a fragmentary perspective view of another portion of the carrier body.
Figure 14:
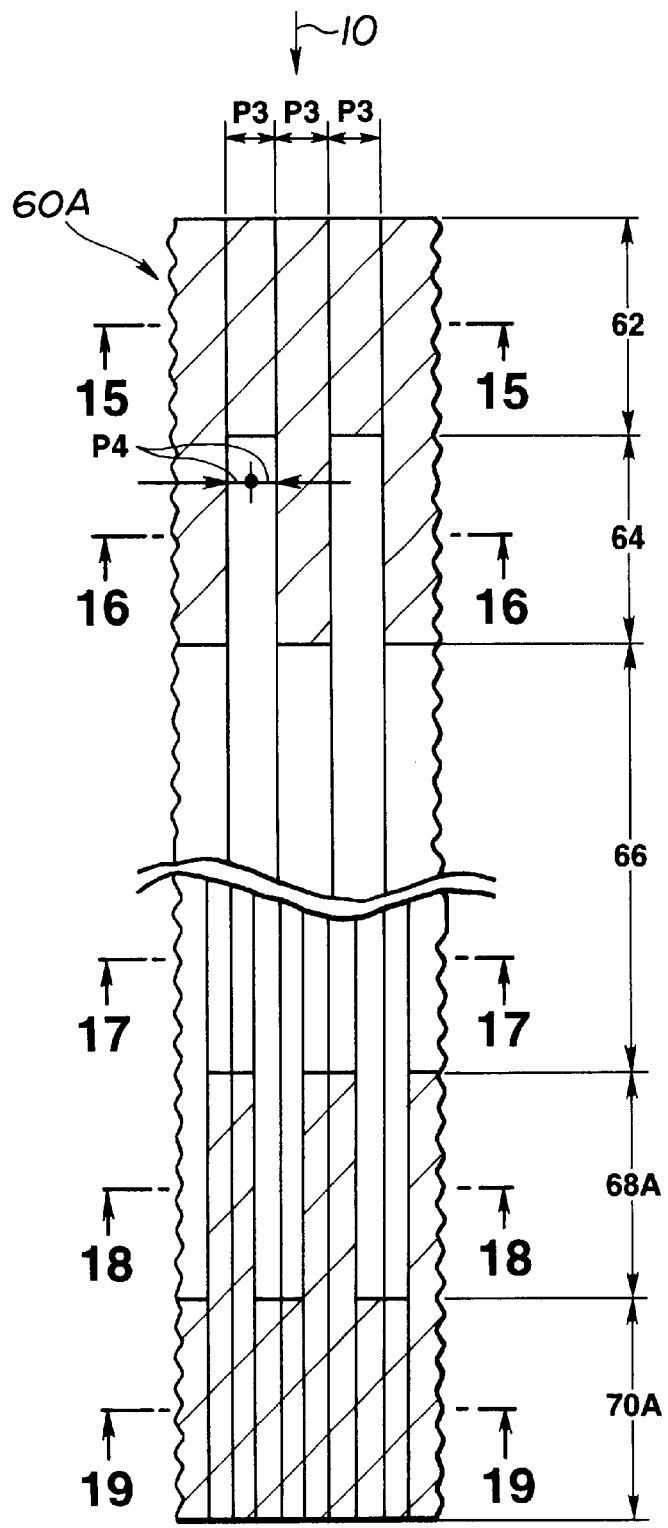
FIG. 14 is a similar view to FIG. 6 illustrating a third embodiment of a carrier body according to the present invention.

Along the boundary between the upstream and first transition regions 62 and 64, cutting every other one of the big waves of the first corrugation 94 permits two small waves of the second corrugation 96 to be formed as shown in FIG. 12. Along the boundary between the first transition and intermediate regions 64 and 66, cutting each of the remaining big waves of the first corrugation 94 permits two small waves of the second corrugation 96 to be formed as shown in FIG. 13.

In a similar manner, the small waves of the second corrugation 96 in the second transition region 60 are formed.

In the carrier body 60, the small waves of the second corrugation 96 have replaced most of the big waves of the first corrugation 94 in the first transition region 64, intermediate region 66 and second transition region 68. The result is a considerarble reduction in the number of contact points between the first and second metal sheets 82 and 84. This is advantageous upon subsequent coating of the carrier body 60 with the catalyst material.

In the upstream and downstream regions 62 and 70, the double corrugated first metal sheet 82 is fixedly secured to the adjacent two layers of the second metal sheet 84. This is effective for the metal sheet 82 to maintain its originally designed shape. This results in an increased structural strength of the carrier body 60, making it possible to extend its service life.

As explained before, every other one of big waves of the first corrugation 94 turns into two small waves of the second corrugation 96 at the boundary between the adjacent regions. The result is an increased integrality between the first corrugation 94 and the second corrugation 96.

The relation that P4=P3×(1/N) holds, where: N is the integer and not less than 2. This is advantageous in forming the small waves of the second corrugation 96 in each of the first and second transition regions 64 and 68. This is because the big waves of the first corrugation 94 and the small waves of the second corrugation 96 are bridged smoothly and continuously. As a result, the productivity as well as the structural strength is enhanced.

In the second embodiment of the carrier body 60, the intermediate region 66, where only the small waves of the second corrugation 96 exist between the adjacent two layers of the second metal sheet 84, is disposed between the upstream and downstream regions 62 and 70. In other words, the big wave-dominating region 62, the small wave-dominating, region 66 and the big wave-dominating region 70 are arranged in the direction of exhaust gases passing through the carrier body 60. This arrangement may be cyclically repeated in the direction of exhaust gases. This cyclical arrangement is advantageous in increasing the diffusion of the exhaust gases passing though the carrier body. This results in increased conversion efficiency of the catalyst. This arrangement provides increased distribution of contact points in the direction of exhaust gases and thus over the length and width of the carrier body, thus providing increased structural strength of the carrier body.

Referring to FIGS. 14 to 19, the third embodiment of a carrier body 60A is described.

The carrier body 60A is substantially the same as the carrier body 60 just described as the second embodiment. However, it is different in that big waves of first corrugation 94 in the downstream region 70A are out of phase with the big waves of the first corrugation 94 in the upstream region 62. In the second transition region 68A (see FIG. 18) of the carrier body 60A, two small waves of second corrugation 96 have replaced every other one of the big waves in the downstream region 70A (see FIG. 19).

This phase-shift provides further increased diffusion of exhaust gases passing though the carrier body 60A. As a result, the conversion efficiency of catalyst is increased further.

What is claimed is:

1. A carrier body for exhaust gas catalysts, comprising:
   a support;
   a plurality of first corrugated metal sheets, each with a first corrugation;
   a plurality of second corrugated metal sheets, each with a second corrugation that is different from said first corrugation;
   said plurality of first corrugated metal sheets and said plurality of second corrugated metal sheets extending generally horizontally within said support and being stacked alternatively to define layers of first and second corrugated metal sheets;

said layers having an upstream region and a downstream region, with respect to a direction in which gas flows, which are spaced from each other and an intermediate region disposed between said upstream and downstream regions;

wherein each of said plurality of said first metal sheets is in contact with the adjacent two of said second metal sheets in each of said upstream and downstream regions at a first group of contact points where the bottom of each trough of said first metal sheet is in contact with the bottom of each trough of one of said adjacent two second metal sheets as well as at a second group of contact points where the top of each crest of said first metal sheet is in contact with the top of each crest of the other of said adjacent two second metal sheets, thereby defining a plurality of sets of parallel independent passages, each of said plurality of sets between adjacent two of said plurality of first metal sheets in each of said upstream and downstream regions;

wherein said plurality of first metal sheets extend throughout said upstream region, said intermediate region and said downstream region, while said plurality of second metal sheets extend over said upstream region and said downstream region only, so that said plurality of first metal sheets do not contact said plurality of second metal sheets in said intermediate region;

wherein said first corrugation has a first periodicity and a first amplitude, and said second corrugation has a second periodicity and a second amplitude;

wherein said first periodicity is substantially equal to said second periodicity and said second amplitude is less than said first amplitude;

wherein only said plurality of first metal sheets extend in said intermediate region to define a plurality of common passages, each between the adjacent two of said first metal sheets, each of said common passages communicating at one end thereof only with one of said plurality of sets of parallel independent passages that exit in said upstream region and communicating at the opposite end thereof only with one of said plurality of sets of parallel independent passages that exit in said downstream region; and wherein said common passages extend in parallel relationship within said support and are separated from each other by engagement of said metal sheets with said support.

2. A carrier body as claimed in claim 1, wherein said first and second corrugations of said first and second plurality of metal sheets have a periodicity permitting said first and second metal sheets to be synchronized with one after another in each of said upstream and downstream regions.

3. A carrier body as claimed in claim 2, wherein only said plurality of first metal sheets extends in said intermediate region.

4. A carrier body as claimed in claim 1, wherein said upstream and downstream regions include one and opposite ends between which said layers extend, respectively.

5. A carrier body as claimed in claim 1, wherein, in each of said upstream and downstream regions, the adjacent two of said plurality of first metal sheets are spaced from each other by one layer of said plurality of second metal sheets; and wherein said second amplitude defines spacing between said adjacent two of said plurality of first metal sheets.

6. A carrier body for exhaust gas catalysts, comprising:

layers of first and second metal sheets defining passages through which gas flows;

said layers having an upstream region and a downstream region, with respect to a direction in which gas flows, spaced from each other, and an intermediate region disposed between said upstream and downstream regions;

wherein said first metal sheets are corrugated and contact said second metal sheets in each of said upstream and downstream regions;

wherein said first metal sheets do not contact said second metal sheets in said intermediate region, wherein, in each of said upstream and downstream regions, said first metal sheets have a first corrugation with a first amplitude; and wherein, in said intermediate region, said first metal sheets have a second corrugation with a second amplitude, which is less than said first amplitude.

7. A carrier body as claimed in claim 6, wherein, in said intermediate region, said second corrugation extends through the whole area of said first metal sheets.

8. A carrier body as claimed in claim 6, wherein, said layers have a first transition region between said upstream region and said intermediate region and a second transition region between said intermediate region and said downstream region.

9. A carrier body as claimed in claim 8, wherein, in each of said first and second transition regions, said first corrugation and said second corrugation coexist.

10. A carrier body as claimed in claim 6, wherein said first corrugation in said downstream region is out of phase with that in said upstream region.

11. A carrier body as claimed in claim 9, wherein said second metal sheet is a generally smooth flat sheet, and wherein said first metal sheet is engaged with said second metal sheet at contact points in each of said upstream and downstream regions.

12. A carrier body as claimed in claim 6, wherein said first corrugation has a first periodicity and said second corrugation has a second periodicity.

13. A carrier body as claimed in claim 8, wherein, in each of said first and second transition regions, each of said first metal sheets includes a plurality of first portions, each having said first corrugation, and a plurality of second portions, each having said second corrugation, and wherein said plurality of first portions and said plurality of second portions are arranged alternately in a transverse direction to the direction in which the gas flows.

14. A carrier body as claimed in claim 12, wherein $$P4 = P3 \times (1/N)$$

where:

N>2 and an integer,

P3 is the first periodicity, and

P4 is the second periodicity.

* * * * *